(12) United States Patent
Yamanaka et al.

(10) Patent No.: US 11,084,895 B2
(45) Date of Patent: Aug. 10, 2021

(54) MODIFIED POLYTETRAFLUOROETHYLENE FINE POWDER AND UNIAXIALLY STRETCHED POROUS BODY

(71) Applicant: DAIKIN INDUSTRIES, LTD., Osaka (JP)

(72) Inventors: Taku Yamanaka, Settsu (JP); Makoto Ono, Settsu (JP); Kohei Yasuda, Settsu (JP); Masahiko Yamada, Settsu (JP); Shinichi Chaen, Settsu (JP); Yasuhiko Sawada, Settsu (JP); Takahiro Taira, Settsu (JP); Hirotoshi Yoshida, Settsu (JP); Taketo Kato, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/038,307

(22) PCT Filed: Dec. 1, 2014

(86) PCT No.: PCT/JP2014/081771
§ 371 (c)(1),
(2) Date: May 20, 2016

(87) PCT Pub. No.: WO2015/080289
PCT Pub. Date: Jun. 4, 2015

(65) Prior Publication Data
US 2016/0289361 A1    Oct. 6, 2016

(30) Foreign Application Priority Data

Nov. 29, 2013  (JP) .............................. JP2013-248706

(51) Int. Cl.
C08F 214/18    (2006.01)
C08J 5/18    (2006.01)
C08F 214/26    (2006.01)
B29C 55/04    (2006.01)

(52) U.S. Cl.
CPC .......... C08F 214/262 (2013.01); B29C 55/04 (2013.01); C08J 5/18 (2013.01); C08F 2500/11 (2013.01); C08F 2500/24 (2013.01); C08F 2500/26 (2013.01); C08F 2800/10 (2013.01); C08J 2327/18 (2013.01)

(58) Field of Classification Search
None
See application file for complete search history.

(56) References Cited

U.S. PATENT DOCUMENTS

| | | |
|---|---|---|
| 3,953,566 A | 4/1976 | Gore |
| 4,439,385 A | 3/1984 | Kuhls et al. |
| 5,234,739 A | 8/1993 | Tanaru et al. |
| 5,547,551 A | 8/1996 | Bahar et al. |
| 5,795,668 A | 8/1998 | Banerjee |
| 5,945,192 A | 8/1999 | Kato et al. |
| 6,013,719 A | 1/2000 | Lahijani |
| 6,054,230 A | 4/2000 | Kato |
| 6,156,451 A | 12/2000 | Banerjee et al. |
| 6,177,533 B1 | 1/2001 | Woodward |
| 6,242,135 B1 | 6/2001 | Mushiake |
| 6,541,589 B1 | 4/2003 | Baillie |
| 7,670,720 B1 | 3/2010 | Buerger et al. |
| 2002/0071980 A1 | 6/2002 | Tabata et al. |
| 2002/0161149 A1 | 10/2002 | Kobayashi et al. |
| 2003/0008198 A1 | 1/2003 | Mukoyama et al. |
| 2005/0025684 A1 | 2/2005 | Jethrow et al. |
| 2005/0186461 A1 | 8/2005 | Hommura et al. |
| 2006/0068258 A1 | 3/2006 | Kinoshita |
| 2007/0009727 A1* | 1/2007 | Sawada ...................... C08J 9/24 428/304.4 |
| 2007/0135558 A1* | 6/2007 | Tsuda ........................ C08F 6/16 524/544 |
| 2008/0083499 A1 | 4/2008 | Nodono |
| 2008/0200571 A1 | 8/2008 | Higuchi et al. |
| 2009/0234032 A1 | 9/2009 | Kimishima |
| 2009/0246592 A1 | 10/2009 | Kinoshita |
| 2009/0281231 A1 | 11/2009 | Kasai et al. |

(Continued)

FOREIGN PATENT DOCUMENTS

| | | |
|---|---|---|
| CN | 1072351 A | 5/1993 |
| CN | 1033428 C | 12/1996 |
| CN | 1351088 A | 5/2002 |
| CN | 1685548 A | 10/2005 |
| CN | 101771153 A | 7/2010 |
| CN | 104884476 A | 9/2015 |
| EP | 0 661 336 A1 | 7/1995 |
| EP | 1 560 284 A1 | 8/2005 |
| EP | 3 061 512 A1 | 8/2016 |
| JP | 5-202217 A | 8/1993 |

(Continued)

OTHER PUBLICATIONS

International Search Report of PCT/JP2014/081771 dated Mar. 3, 2015.

(Continued)

*Primary Examiner* — Kara B Boyle
(74) *Attorney, Agent, or Firm* — Sughrue Mion, PLLC

(57) ABSTRACT

The present invention aims to provide a modified polytetrafluoroethylene fine powder capable of providing a stretched body having high strength, a small pore size, and excellent homogeneity. The modified polytetrafluoroethylene fine powder of the present invention has non-melt-processability, has a standard specific gravity of 2.155 or lower, includes 0.015 mol % or more of a polymer unit derived from perfluoro(methyl vinyl ether) in all the monomer units, is obtained by emulsion polymerizing tetrafluoroethylene and at least the perfluoro(methyl vinyl ether) in the presence of a fluorosurfactant having a LogPOW value of 3.4 or lower, and has an extrusion pressure of 20.0 MPa or lower.

16 Claims, 1 Drawing Sheet

(56) References Cited

U.S. PATENT DOCUMENTS

| | | |
|---|---|---|
| 2010/0160510 A1 | 6/2010 | Aten et al. |
| 2011/0008708 A1 | 1/2011 | Akita et al. |
| 2011/0020728 A1 | 1/2011 | Kita et al. |
| 2011/0027688 A1 | 2/2011 | Hommura et al. |
| 2011/0039960 A1 | 2/2011 | Xu et al. |
| 2011/0040054 A1 | 2/2011 | Higuchi et al. |
| 2012/0028046 A1 | 2/2012 | Ono et al. |
| 2013/0040142 A1* | 2/2013 | Frey .......................... C08F 2/24 428/402 |
| 2013/0172477 A1 | 7/2013 | Hintzer et al. |
| 2013/0183515 A1 | 7/2013 | White |
| 2013/0267621 A1 | 10/2013 | Sawada et al. |
| 2013/0281558 A1 | 10/2013 | Sawada et al. |
| 2014/0200310 A1 | 7/2014 | Taira et al. |
| 2014/0343239 A1 | 11/2014 | Higuchi et al. |
| 2015/0082757 A1 | 3/2015 | Chaen et al. |
| 2015/0299341 A1 | 10/2015 | Nanba |
| 2017/0001155 A1 | 1/2017 | Chaen et al. |
| 2017/0002156 A1 | 1/2017 | Chaen et al. |
| 2017/0005354 A1 | 1/2017 | Inoue et al. |
| 2017/0012313 A1 | 1/2017 | Inoue et al. |

FOREIGN PATENT DOCUMENTS

| | | | |
|---|---|---|---|
| JP | 8-162132 | A | 6/1996 |
| JP | 11-501961 | A | 2/1999 |
| JP | 11-240917 | A | 9/1999 |
| JP | 2000-143727 | A | 5/2000 |
| JP | 2002-201217 | A | 7/2002 |
| JP | 3552686 | B2 | 8/2004 |
| JP | 2005-520002 | A | 7/2005 |
| JP | 2006-49002 | A | 2/2006 |
| JP | 2006-504848 | A | 2/2006 |
| JP | 2008-512551 | A | 4/2008 |
| JP | 4402625 | B2 | 1/2010 |
| JP | 2010-58026 | A | 3/2010 |
| JP | 4951970 | B2 | 6/2012 |
| WO | 96/28242 | A1 | 9/1996 |
| WO | 96/28501 | A1 | 9/1996 |
| WO | 03/022912 | A2 | 3/2003 |
| WO | 03/033555 | A1 | 4/2003 |
| WO | 2004/041529 | A1 | 5/2004 |
| WO | 2005/042593 | A1 | 5/2005 |
| WO | 2005/061567 | A1 | 7/2005 |
| WO | 2006/031456 | A1 | 3/2006 |
| WO | 2007/005361 | A1 | 1/2007 |
| WO | 2007/011492 | A1 | 1/2007 |
| WO | 2007/024762 | A2 | 3/2007 |
| WO | 2007/046345 | A1 | 4/2007 |
| WO | 2007/069714 | A1 | 6/2007 |
| WO | 2009/001894 | A1 | 12/2008 |
| WO | 2009/116446 | A1 | 9/2009 |
| WO | 2009/142080 | A1 | 11/2009 |
| WO | 2010076661 | A1 | 7/2010 |
| WO | 2010/098135 | A1 | 9/2010 |
| WO | 2010/110851 | A2 | 9/2010 |
| WO | 2010/113950 | A1 | 10/2010 |
| WO | 2012/033804 | A1 | 3/2012 |
| WO | 2013/027850 | A1 | 2/2013 |
| WO | 2013/115278 | A1 | 8/2013 |
| WO | 2013/157647 | A1 | 10/2013 |

OTHER PUBLICATIONS

Communication dated Aug. 11, 2017, issued by the United States Patent and Trademark Office in co-pending U.S. Appl. No. 15/100,010.
Communication dated Nov. 27, 2017 from the United States Patent and Trademark Office in related U.S. Appl. No. 15/100,048.
Database WPI, Week 200572; Thomas Scientific, London, GB, XP-002768565 & WO 2005/090480 (4 pages total) Sep. 29, 2005.
Communication dated Apr. 7, 2017, from the European Patent Office in counterpart European Application No. 14865872.7.
Communication dated Apr. 19, 2017, from the European Patent Office in counterpart European Application No. 14865651.5.
International Search Report dated Mar. 3, 2015 from the International Searching Authority in counterpart International Application No. PCT/JP2014/081795.
International Search Report dated Feb. 24, 2015 from the International Searching Authority in counterpart International Application No. PCT/JP2014/081779.
International Search Report dated Mar. 10, 2015 from the International Searching Authority in counterpart International Application No. PCT/JP2014/081775.
International Search Report dated Mar. 10, 2015 from the International Searching Authority in counterpart International Application No. PCT/JP2014/081777.
International Preliminary Report on Patentability dated Jun. 28, 2016 from the International Bureau in counterpart International Application No. PCT/JP2014/081795.
International Preliminary Report on Patentability dated May 31, 2016 from the International Bureau in counterpart International Application No. PCT/JP2014/081779.
International Preliminary Report on Patentability dated May 31, 2016 from the International Bureau in counterpart International Application No. PCT/JP2014/081771.
International Preliminary Report on Patentability dated May 31, 2016 from the International Bureau in counterpart International Application No. PCT/JP2014/081775.
International Preliminary Report on Patentability dated May 31, 2016 from the International Bureau in counterpart International Application No. PCT/JP2014/081777.
Communication dated May 22, 2017 from the European Patent Office in counterpart Application No. 14866220.8.
Communication dated May 24, 2017 from the European Patent Office in counterpart Application No. 14865899.0.
Communication dated Jun. 2, 2017 from the European Patent Office in counterpart Application No. 14865549.1.
Hongwei Zhang, et al.; "Recent Development of Polymer Electrolyte Membranes for Fuel Cells"; Chemical Reviews; vol. 112, No. 5, May 9, 2012; pp. 2780-2832; XP055375431.
Pattabiraman Krishnamurthy et al.; "Performance of a 1kW Class Nafion-PTFE Composite Membrane Fuel Stack"; International Journal of Chemical Engineering, vol. 2012, Article ID 512803; pp. 1-8.
Michael Wikol et al.; "Expanded Polytetrafluoroethylene Membranes and Their Applications"; Extracted from Filtration and Purification in the Biopharmaceutical Industry, Second Edition; W.L. Gore & Associates, Inc.; Chapter 23, pp. 619-640 (Feb. 2008).
Xinmin Hao et al.; "Studies on Porous and Morphological Structures of Expanded PTFE Membrane Through Biaxial Stretching Technique"; INJ Summer 2005; pp. 31-38.
Final Office Action dated Apr. 19, 2018 from the United States Patent and Trademark Office in related U.S. Appl. No. 15/100,010.
Office Action dated Apr. 10, 2018, which issued during the prosecution of U.S. Appl. No. 15/100,048.
Communication dated Nov. 29, 2018, from United States Patent and Trademark Office in related U.S. Appl. No. 15/100,048.
An Office Action dated May 31, 2018, which issued during the prosecution of U.S. Appl. No. 15/100,002.
Communication dated Nov. 16, 2018, from United States Patent and Trademark Office in related U.S. Appl. No. 15/100,010.
Communication dated May 30, 2019 from the United States Patent and Trademark Office in U.S. Appl. No. 15/100,010.
Communication dated May 1, 2019 from the United States Patent and Trademark Office in related U.S. Appl. No. 15/100,048.
Communication dated Jan. 31, 2019 from the United States Patent and Trademark Office in U.S. Appl. No. 15/100,013.
Communication dated Feb. 6, 2019 from the United States Patent and Trademark Office in U.S. Appl. No. 15/100,002.
Communication dated Oct. 17, 2019 from the United States Patent and Trademark Office in Counterpart U.S. Appl. No. 15/100,013.
Communication dated Oct. 18, 2019 from the United States Patent and Trademark Office in Counterpart U.S. Appl. No. 15/100,048.
Communication dated Jul. 10, 2019 from the United States Patent and Trademark Office of co-pending U.S. Appl. No. 15/100,013.
Communication dated Jul. 18, 2019 from the United States Patent and Trademark Office of co-pending U.S. Appl. No. 15/100,002.

(56) References Cited

OTHER PUBLICATIONS

Office Action dated Jan. 31, 2020 in U.S. Appl. No. 15/100,048.
Notice of Allowance and Fee(s) Due dated Apr. 1, 2020 from the United States Patent and Trademark Office in U.S. Appl. No. 15/100,002.
Notice of Allowance dated Nov. 19, 2019 issued in U.S. Appl. No. 15/100,010.
Notice of Allowance dated Dec. 9, 2020 from the USPTO in related U.S. Appl. No. 15/100,048.
Final Office Action dated Jul. 24, 2020 in U.S. Appl. No. 15/100,048.
Sina Ebnesajjad., Extract from Expanded PTFE Applications Handbook Technology, Manufacturing and Applications, 2017, ( 5 pages total).
Brief Communication dated Apr. 19, 2021, from the European Patent Office in application No. 14865899.0.
Experimental Data submitted Apr. 9, 2021 in an Opposition to related EP Patent No. 3065209.
Summons to attend oral proceedings dated Jun. 1, 2021, from the European Patent Office in application No. 14865899.0.

* cited by examiner

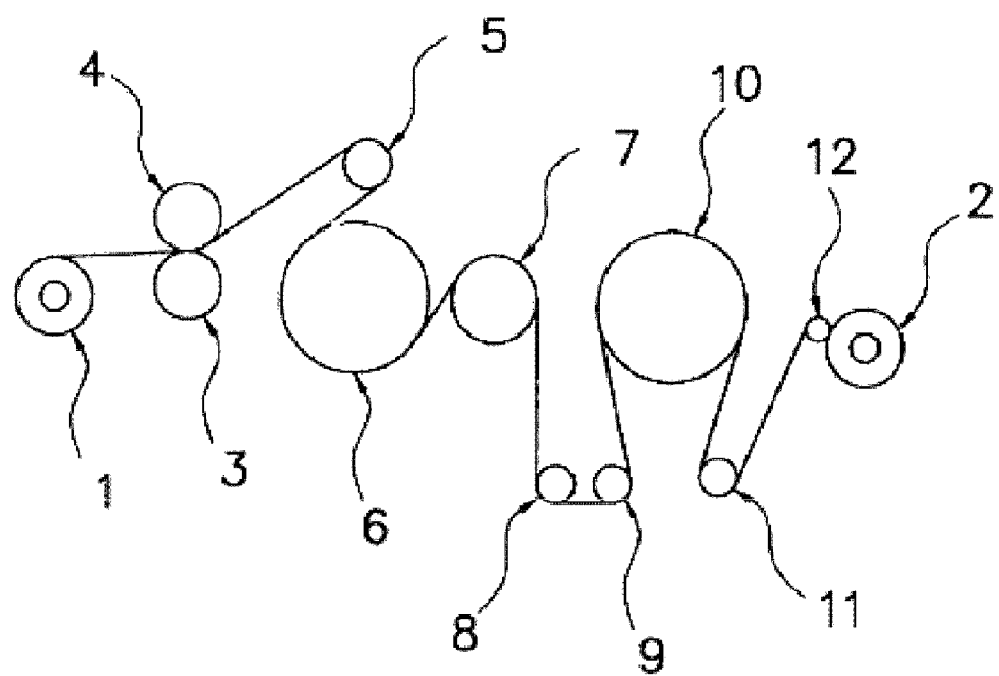

MODIFIED POLYTETRAFLUOROETHYLENE FINE POWDER AND UNIAXIALLY STRETCHED POROUS BODY

CROSS REFERENCE TO RELATED APPLICATIONS

This application is a National Stage of International Application No. PCT/JP2014/081771 filed Dec. 1, 2014, claiming priority based on Japanese Patent Application No. 2013-248706 filed Nov. 29, 2013, the contents of all of which are incorporated herein by reference in their entirety.

TECHNICAL FIELD

The present invention relates to modified polytetrafluoroethylene fine powders and uniaxially stretched porous bodies.

BACKGROUND ART

It is known in the art that a high-porosity porous body can be obtained by stretching a molded article produced by paste extrusion molding polytetrafluoroethylene fine powder. This polytetrafluoroethylene porous body consists of nodes (knots) and fibrils (fibers) and allows gas such as water vapor to pass therethrough, but does not allow water drops to pass therethrough owing to strong water repellency of polytetrafluoroethylene. This stretched porous body can be used as a sealing material without being sintered, or can be used in clothes or separation membranes after being sintered and formed into a tough, continuously stretched sheet or tube.

Such a stretched porous body is easily broken in steps such as stretching, taking-up after the stretching, and lamination, and is also easily broken when used for cloths or separation membranes. Thus, a material capable of providing stretched porous bodies having high strength is desired.

For example, Patent Literature documents 1 and 2 disclose a high molecular weight tetrafluoroethylene homopolymer having a specific breaking strength.

Patent Literature documents 3 to 5 disclose a polytetrafluoroethylene aqueous dispersion obtained by polymerization in the presence of a specific emulsifier.

Patent Literature documents 6 to 8 disclose a tetrafluoroethylene-based copolymer modified with a perfluoroalkyl ethylene (PFAE).

Patent Literature 9 discloses a non-melt-processable polytetrafluoroethylene fine powder for molding stretched articles obtained by polymerizing tetrafluoroethylene and perfluoro(methyl vinyl ether).

CITATION LIST

Patent Literature

Patent Literature 1: JP 2000-143727 A
Patent Literature 2: JP 2002-201217 A
Patent Literature 3: WO 2007/046345
Patent Literature 4: WO 2009/001894
Patent Literature 5: WO 2010/113950
Patent Literature 6: JP H11-240917 A
Patent Literature 7: WO 2003/033555
Patent Literature 8: WO 2007/024762
Patent Literature 9: JP 4951970 B

SUMMARY OF INVENTION

Technical Problem

Although Patent Literature documents 1 to 5 disclose a high molecular weight tetrafluoroethylene homopolymer having a specific breaking strength, stretched articles obtained by stretching such a homopolymer still have an insufficient strength.

The PTFE fine powder modified with a perfluoroalkyl ethylene (PFAE), which is disclosed in Patent Literature documents 6 to 8, is high in the extrusion pressure in paste extrusion, and thus is less likely to be compressed during rolling and disadvantageously provides a poorly homogeneous molded article. If the PTFE fine powder modified with perfluoro(methyl vinyl ether) disclosed in Patent Literature 9 contains a large amount of perfluoro(methyl vinyl ether), it shows a high extrusion pressure in paste extrusion. Thus, such a PTFE fine powder is less likely to be compressed during rolling and the resulting molded article has poor homogeneity, similar to the PTFE fine powder modified with a perfluoroalkyl ethylene (PFAE).

The present invention aims to provide a modified polytetrafluoroethylene fine powder capable of providing stretched bodies having high strength, a small pore size, and excellent homogeneity.

Solution to Problem

The present invention relates to a modified polytetrafluoroethylene fine powder, having non-melt-processability, having a standard specific gravity of 2.155 or lower, comprising 0.015 mol % or more of a polymer unit derived from perfluoro(methyl vinyl ether) in all the monomer units, being obtained by emulsion copolymerizing tetrafluoroethylene and at least the perfluoro(methyl vinyl ether) in the presence of a fluorosurfactant having a LogPOW value of 3.4 or lower, and having an extrusion pressure of 20.0 MPa or lower.

In the modified polytetrafluoroethylene fine powder, the amount of the polymer unit derived from the perfluoro (methyl vinyl ether) is preferably 0.025 mol % or more in all the monomer units.

The modified polytetrafluoroethylene fine powder preferably has a breaking strength of 28 N or higher, more preferably 30 N or higher, still more preferably 32 N or higher, particularly preferably 34 N or higher, especially preferably 36 N or higher.

The modified polytetrafluoroethylene fine powder preferably has an average primary particle size of 210 nm or greater and 300 nm or smaller.

The present invention also relates to a uniaxially stretched porous body which is formed from the modified polytetrafluoroethylene fine powder.

The uniaxially stretched porous body is preferably a film.

The uniaxially stretched porous body is also preferably a tube.

The uniaxially stretched porous body is also preferably a fiber.

Advantageous Effects of Invention

The modified polytetrafluoroethylene fine powder of the present invention is capable of providing stretched bodies having high strength, a small pore size, and excellent homogeneity.

BRIEF DESCRIPTION OF THE DRAWING

FIG. 1 is a schematic cross-sectional view showing the outline of a roll stretching machine used in examples.

DESCRIPTION OF EMBODIMENTS

The present invention will be described in detail below.

The modified polytetrafluoroethylene (PTFE) fine powder of the present invention includes PTFE that has non-melt-processability, has a standard specific gravity of 2.155 or lower, includes 0.015 mol % or more of a polymer unit derived from perfluoro(methyl vinyl ether) in all the monomer units, is obtained by emulsion copolymerizing tetrafluoroethylene and at least the perfluoro(methyl vinyl ether) in the presence of a fluorosurfactant having a LogPOW value of 3.4 or lower, and has an extrusion pressure of 20.0 MPa or lower.

Since the modified polytetrafluoroethylene fine powder of the present invention is obtained by emulsion copolymerizing tetrafluoroethylene and perfluoro(methyl vinyl ether) (PMVE) in the presence of a fluorosurfactant having a LogPOW value of 3.4 or lower, the stretchability thereof is not deteriorated even if the modified PTFE fine powder contains a large amount of a polymer unit derived from PMVE, and the modified PTFE fine powder is capable of providing stretched bodies having high strength, a small pore size, and excellent homogeneity using very usual molding and stretching equipment.

The modified PTFE fine powder of the present invention has non-melt-processability. The non-melt-processability herein means a feature that makes it impossible to determine the melt flow rate at a temperature higher than the crystallization melting point, in other words, a feature of the polymer that does not easily flow even within a melting temperature zone, in conformity with ASTM D-1238 and D-2116.

The modified PTFE fine powder of the present invention has a standard specific gravity (SSG) of 2.155 or lower. In order to provide a stretched body having higher strength, a smaller pore size, and better homogeneity, the standard specific gravity (SSG) is more preferably 2.150 or lower, still more preferably 2.145 or lower.

For suppression of an increase in the paste extrusion pressure and excellent moldability during paste extrusion molding, the standard specific gravity (SSG) is preferably 2.130 or higher.

The SSG is a SSG defined in ASTM D4895-89 as a standard for the molecular weight of non-melt-processable polytetrafluoroethylene.

The modified PTFE fine powder of the present invention includes PTFE including 0.015 mol % or more of a polymer unit derived from PMVE in all the monomer units constituting the PTFE.

In order to provide a stretched body having higher strength, a smaller pore size, and better homogeneity, the amount of the polymer unit derived from PMVE is more preferably 0.025 mol % or more in all the monomer units.

The upper limit of the amount of the polymer unit derived from PMVE is 0.150 mol %, for example. If the amount thereof exceeds 0.150 mol %, the modified PTFE fine powder may lose the stretchability and may be easily broken in stretching.

In order to provide a stretched body having higher strength, a smaller pore size, and better homogeneity, the amount thereof is preferably 0.100 mol % or less, more preferably 0.050 mol % or less.

The modified PTFE fine powder of the present invention may comprise a polymer unit derived from a monomer other than TFE and PMVE, or may consist of a polymer derived from TFE and PMVE. The modified PTFE fine powder preferably consists of a polymer derived from TFE and PMVE.

Examples of the monomer other than TFE and PMVE include fluoroolefins such as hexafluoropropylene (HFP) and chlorotrifluoroethylene (CTFE); fluoro(alkyl vinyl ethers) having a C1-C5, particularly C1-C3, alkyl group; fluorinated cyclic monomers such as fluorodioxole; perfluoroalkyl ethylenes; and ω-hydroperfluoroolefins.

A polymer derived from the monomer other than TFE and PMVE is used in an amount of preferably 0.0001 to 0.300 mol %, more preferably 0.010 to 0.100 mol %.

The modified PTFE fine powder of the present invention is obtained by emulsion polymerizing TFE and at least PMVE in the presence of a fluorosurfactant having a LogPOW value of 3.4 or lower.

It is feared that compounds having a high LogPOW value cause environmental loads. In consideration of this fear, a compound having a LogPOW value of 3.4 or smaller is preferred. In conventional production of a fluoropolymer by emulsion polymerization, ammonium perfluorooctanoate (PFOA) is mainly used as a surfactant. However, PFOA has a LogPOW value of 3.5, and thus it is preferably replaced by a fluorosurfactant having a LogPOW value of 3.4 or lower.

In contrast, fluorosurfactants having a LogPOW value of 3.4 or lower disadvantageously have a poor emulsifying ability. In order to provide polytetrafluoroethylene having a high breaking strength, the stability of the aqueous dispersion during the polymerization is believed to be important. Actually, use of a fluorosurfactant having a poor emulsifying ability results in an insufficient breaking strength.

Thus, WO 2009/001894 discloses a method in which a large amount of a fluorosurfactant having a low LogPOW value is used so as to improve the stability of an aqueous dispersion. However, even polytetrafluoroethylene obtained by this method has an insufficient breaking strength.

In the present invention, the modified PTFE fine powder is formed by emulsion polymerizing tetrafluoroethylene and at least perfluoro(methyl vinyl ether) (PMVE) in the presence of a fluorosurfactant having a LogPOW value of 3.4 or lower. Thus, the stretchability thereof is not deteriorated even if the modified PTFE fine powder contains a large amount of the polymer unit derived from PMVE, and the modified PTFE fine powder is capable of providing a stretched body having high strength, a small pore size, and excellent homogeneity.

The fluorosurfactant may have a LogPOW value of 2.5 or higher, or may have a LogPOW value of 3.0 or higher.

The LogPOW value is a partition coefficient between 1-octanol and water, and is represented by LogP, wherein P represents the ratio of (fluorosurfactant concentration in octanol)/(fluorosurfactant concentration in water) when an octanol/water (1:1) liquid mixture containing a fluorosurfactant is phase-separated.

The octanol-water partition coefficient represented by LogPOW is calculated as follows. HPLC is performed on standard substances (heptanoic acid, octanoic acid, nonanoic acid, and decanoic acid) each having a known octanol-water partition coefficient using TOSOH ODS-120T column (φ4.6 mm×250 mm) as a column and acetonitrile/0.6 mass % $HClO_4$ aqueous solution=1/1 (vol/vol %) as an eluent at a flow rate of 1.0 ml/min, a sample amount of 300 μL, and a column temperature of 40° C., with detection light UV 210 nm. A calibration curve between the respective elution times and the known octanol-water partition coefficients is drawn, and the LogPOW value is calculated from the elution time of the sample liquid in HPLC based on the calibration curve.

The fluorosurfactant having a LogPOW value of 3.4 or lower is preferably an anionic fluorosurfactant. Examples thereof include those disclosed in US 2007/0015864 A, US 2007/0015865 A, US 2007/0015866 A, US 2007/0276103 A, US 2007/0117914 A, US 2007/142541 A, US 2008/0015319 A, U.S. Pat. Nos. 3,250,808 B, 3,271,341 B, JP 2003-119204 A, WO 2005/042593, WO 2008/060461, WO 2007/046377, WO 2007/119526, WO 2007/046482, and WO 2007/046345.

The fluorosurfactant having a LogPOW value of 3.4 or lower is preferably at least one fluorosurfactant selected from the group consisting of those represented by the following formula:

$$CF_3\text{—}(CF_2)_4\text{—}COOX$$

(wherein X represents a hydrogen atom, $NH_4$, or an alkali metal), those represented by the following formula:

$$CF_3CF_2CF_2OCF(CF_3)COOX$$

(wherein X represents a hydrogen atom, $NH_4$, or an alkali metal atom), those represented by the following formula:

$$CF_3OCF(CF_3)CF_2OCF(CF_3)COOX$$

(wherein X represents a hydrogen atom, $NH_4$, or an alkali metal atom), and those represented by the following formula:

$$CF_3CF_2OCF_2CF_2OCF_2COOX$$

(wherein X represents a hydrogen atom, $NH_4$, or an alkali metal atom).

The fluorosurfactant having a LogPOW value of 3.4 or lower may also be any of those represented by the following formula:

$$CF_3OCF_2CF_2OCF_2CF_2COOX$$

(wherein X represents a hydrogen atom, $NH_4$, or an alkali metal atom) and those represented by the following formula:

$$CF_3OCF_2CF_2CF_2OCHFCF_2COOX$$

(wherein X represents a hydrogen atom, $NH_4$, or an alkali metal atom).

If the fluorosurfactant is a salt, a counter ion constituting the salt may be an alkali metal ion or $NH_4^+$, for example, and examples of the alkali metal ion include $Na^+$ and $K^+$.

Examples of the fluorosurfactant having a LogPOW value of 3.4 or lower include $CF_3OCF(CF_3)CF_2OCF(CF_3)COOH$, $CF_3OCF(CF_3)$ $CF_2OCF(CF_3)$ $COONH_4$, $CF_3CF_2OCF_2CF_2OCF_2COOH$, $CF_3CF_2OCF_2CF_2OCF_2COONH_4$, $CF_3OCF_2CF_2CF_2OCHFCF_2COOH$, $CF_3OCF_2CF_2CF_2OCHFCF_2COONH_4$, $CF_3\text{—}(CF_2)_4\text{—}COOH$, $CF_3\text{—}(CF_2)_4\text{—}COONH_4$, $CF_3CF_2CF_2OCF(CF_3)COONH_4$, and $CF_3CF_2CF_2OCF(CF_3)COOH$.

The specifications of the emulsion copolymerization will be described in the production method for modified PTFE fine powder to be mentioned later.

The modified PTFE fine powder of the present invention has an extrusion pressure of 20.0 MPa or lower. In order to provide a stretched body having higher strength, a smaller pore size, and better homogeneity, the extrusion pressure is preferably 19.0 MPa or lower, more preferably 18.0 MPa or lower.

The lower limit of the extrusion pressure may be any value, and may be 12.0 MPa, for example. In order to provide a stretched body having higher strength, a smaller pore size, and better homogeneity, the extrusion pressure is more preferably 14.0 MPa or higher, still more preferably 15.0 MPa or higher.

If the extrusion pressure is too high, the resulting extrudate tends to be hard and less likely to be compressed during a rolling step to be mentioned later, so that the homogeneity of the rolled film and uniaxially stretched film tends to be poor.

PTFE having a low extrusion pressure tends to cause a biaxially stretched porous film to have low strength. Still, even with an extrusion pressure within the above range, the modified fine powder of the present invention can surprisingly have excellent strength.

The extrusion pressure is a value determined by the following method in conformity with JP 2002-201217 A.

First, 100 g of PTFE fine powder is left to stand at room temperature for two hours or longer. The powder is blended with 21.7 g of a lubricant (trade name: Isopar H (registered tradename), Exxon Mobil Corp.) for three minutes. Thereby, a PTFE fine powder mixture is obtained.

The resulting PTFE fine powder mixture is left to stand for two hours in a 25° C. temperature-constant chamber, and then paste-extruded through an orifice (diameter: 2.5 mm, land length: 1.1 cmm, introduction angle: 30°) at a reduction ratio (ratio between the cross-sectional area of the inlet of the die and the cross-sectional area of the outlet thereof) of 100, an extrusion rate of 51 cm/min, and 25° C. Thereby, beading is obtained.

The extrusion pressure is a value determined by measuring a load when the extrusion load reaches equilibrium during the paste extrusion, and then dividing the measured load by the cross-sectional area of a cylinder used in the paste extrusion.

In order to provide a stretched body having higher strength, a smaller pore size, and better homogeneity, the modified PTFE fine powder preferably has a breaking strength of 28 N or higher. The breaking strength is more preferably 30 N or higher, still more preferably 32 N or higher, particularly preferably 34 N or higher, especially preferably 36 N or higher.

The breaking strength is preferably as high as possible, and the upper limit thereof may be 70 N, for example.

The breaking strength is a value determined by the following method in conformity with JP 2002-201217 A.

First, the extrusion beading is subjected to a stretching test in the following method, and thereby a sample for breaking strength measurement is produced.

The beading obtained by the paste extrusion is dried at 230° C. for 30 minutes so that the lubricant is removed. The dried beading is cut into an appropriate length and the cut beading is held at its ends by clamps with a gap between the clamps of 5.1 cm. The beading is then heated up to 300° C. in an air-circulation furnace, and the clamps are moved apart from each other at a stretching rate of 100%/sec until the distance between the clamps corresponds to a total stretch of 2400%. Thereby, the stretching test is performed. The "total stretch" refers to the rate of increase in the length of the beading by the stretching based on the length of the beading (100%) before the stretch test.

The stretched beading prepared under the aforementioned stretching conditions is cut into an appropriate length, and the cut beading is fixed by movable jaws with a gauge length of 5.0 cm. The movable jaws are driven at a speed of 300 mm/min, and the breaking strength is measured using a tensile tester at room temperature. The minimum tensile load (force) at break among the tensile loads at break of three samples obtained from the stretched beading, i.e., two samples from the respective ends of the stretched beading (excluding the neck down within the range of the clamps, if exist), and one sample from the center thereof, is defined as the breaking strength.

In order to provide a stretched body having higher strength, a smaller pore size, and better homogeneity, the modified PTFE fine powder of the present invention has a stress-relaxation time of 100 seconds or longer, preferably 200 seconds or longer, more preferably 300 seconds or longer.

The stress-relaxation time is a value determined by the following method in conformity with JP 2002-201217 A.

The dried beading is stretched in the same manner as in the above stretching test except that the gap between clamps is changed to 3.8 cm and the stretching rate is 1000%/s, and thereby a sample for stress-relaxation time measurement is produced. The total stretch is 2400%.

This sample is fixed at both ends by fixing parts and tightly pulled so that the whole length is 25 cm. The stress-relaxation time is a time from when this sample is put into an oven set to 390° C. to when the sample is broken.

In order to provide a stretched body having higher strength, a smaller pore size, and better homogeneity, the modified PTFE fine powder of the present invention preferably has an average primary particle size of 210 nm or greater and 300 nm or smaller.

The greater the average primary particle size of the modified PTFE fine power is, the more an increase in the paste extrusion pressure during paste extrusion molding of the PTFE powder is suppressed and the more easily the fine powder is rolled.

The average primary particle size is more preferably 220 nm or greater.

The average primary particle size can be determined as follows. Using an aqueous dispersion of PTFE obtained by polymerization, a calibration curve is drawn between the transmittance of 550-nm incident light to the unit length of the aqueous dispersion with a polymer concentration of 0.22 mass % and the average primary particle size determined by measuring the Feret diameters in a transmission electron microscopic image; the transmittance of the target aqueous dispersion is measured; and then the average particle size is determined on the basis of the calibration curve.

The modified PTFE fine powder of the present invention usually has an average particle size of 100 to 1000 μm. In order to provide a stretched body having better homogeneity, the average particle size is preferably 300 to 800 μm, more preferably 400 to 700 μm.

The average particle size of the modified PTFE fine powder is a value determined in conformity with JIS K6891.

The modified PTFE fine powder of the present invention usually has stretchability, fibrillatability, and non-melt-processability.

The modified PTFE fine powder of the present invention may comprise PTFE having a core-shell structure. The core-shell structured polytetrafluoroethylene may be, for example, polytetrafluoroethylene whose particles each include a core of a high molecular weight polytetrafluoroethylene and a shell of a lower molecular weight polytetrafluoroethylene.

Such polytetrafluoroethylene may be polytetrafluoroethylene described in JP 2005-527652 T, for example.

The modified PTFE fine powder of the present invention is particularly suitable as a material for molding porous bodies.

The modified PTFE fine powder of the present invention can be used for filters such as liquid chemical filters and air filters, membranes, fibers, rods and tubes, for example. It is also useful as a material for textile products or products in the medical treatment field or the semiconductor field.

The method of producing the modified PTFE fine powder of the present invention is described below.

The modified PTFE fine powder of the present invention can be produced by a production method including: a step of putting a fluorosurfactant having a LogPOW value of 3.4 or lower, an aqueous medium, TFE and PMVE, and if necessary an optional monomer other than TFE and PMVE, into a polymerization vessel; a step of initiating emulsion copolymerization of TFE, PMVE, and the optional monomer other than TFE and PMVE, by putting a polymerization initiator into the polymerization vessel; and a step of coagulating PTFE in the resulting PTFE aqueous dispersion.

TFE, PMVE, and the optional monomer other than TFE and PMVE may be supplied at once before the start of the polymerization, or may be continually or intermittently supplied.

The above production method usually includes a step of collecting the modified PTFE fine powder from the PTFE aqueous dispersion after the PTFE is coagulated.

The emulsion copolymerization is described below with reference to a more specific example. For example, the emulsion copolymerization is performed as follows. An aqueous medium and the fluorosurfactant are charged into a pressure-resistant reaction container equipped with a stirrer and the oxygen in the container is removed. Then, tetrafluoroethylene (TFE) and PMVE, and if necessary an optional monomer other than TFE and PMVE are charged into the container and the system is set to a predetermined temperature. Next, a polymerization initiator is added so as to start the emulsion copolymerization. The pressure decreases as the reaction proceeds. In order to maintain the initial pressure, the TFE and, if necessary, PMVE and the optional monomer other than TFE and PMVE are additionally supplied in a continual or intermittent manner. Supply of the TFE and the trace comonomer is stopped when the amounts thereof reach predetermined amounts. Then, the TFE inside the reaction container is purged and the temperature is returned to room temperature. Thereby, the reaction is completed.

The emulsion copolymerization is usually performed in the presence of an aqueous medium. In the emulsion copolymerization, the amount of the fluorosurfactant is preferably 0.0001 to 10 mass % based on the amount of the aqueous medium. The lower limit thereof is more preferably 0.1 mass %, whereas the upper limit thereof is more preferably 2 mass %, still more preferably 1 mass %. If the amount of the fluorosurfactant is too small, the dispersibility may be insufficient. If the amount of the fluorosurfactant is too large, the effects do not compensate for the amount. On the contrary, the polymerization rate may decrease or the reaction may stop, for example. The amount of the fluorosurfactant is appropriately determined in accordance with, for example, the molecular weight of the target PTFE.

In order to cut the cost, the upper limit thereof is preferably 0.5 mass %, more preferably 0.3 mass %. Even with 0.2 mass % or smaller of a fluorosurfactant, a stable modified PTFE aqueous dispersion can be produced.

The aqueous medium means a medium which gives a place of the polymerization and is a liquid that contains water. The aqueous medium may be water alone or any of those containing water. It may be one containing water and one or both of any fluorine-free organic solvent, such as alcohols, ethers, and ketones, and any fluorine-containing organic solvent having a boiling point of 40° C. or lower.

The polymerization initiator used in the emulsion copolymerization can be any of those conventionally used in polymerization of TFE.

The polymerization initiator in the emulsion copolymerization may be a radical polymerization initiator or a redox polymerization initiator, for example.

In order to provide PTFE having a low SSG, the amount of the polymerization initiator is preferably as small as possible. Still, too small an amount of the polymerization initiator tends to cause too low a polymerization rate, whereas too large an amount thereof tends to cause generation of high SSG PTFE.

Examples of the radical polymerization initiator include water-soluble peroxides. The radical polymerization initiator is preferably any of persulfates, such as ammonium persulfate and potassium persulfate, and water-soluble organic peroxides, such as disuccinic acid peroxide, more preferably ammonium persulfate or disuccinic acid peroxide.

The amount of the radical polymerization initiator can be appropriately selected in accordance with the polymerization temperature and the target SSG. It is preferably an amount corresponding to 1 to 100 ppm, more preferably an amount corresponding to 1 to 20 ppm, still more preferably an amount corresponding to 1 to 6 ppm, of the mass of an aqueous medium usually used.

If the polymerization initiator is a radical polymerization initiator, the radical concentration in the system can be adjusted by adding a decomposer for peroxides such as ammonium sulfite during the polymerization.

If the polymerization initiator is a radical polymerization initiator, PTFE having a low SSG can be easily obtained by adding a radical scavenger during the polymerization.

Examples of the radical scavenger include unsubstituted phenols, polyphenols, aromatic hydroxy compounds, aromatic amines, and quinone compounds. Hydroquinone is particularly preferred.

In order to provide PTFE having a low SSG, the radical scavenger is preferably added before 50 mass % of the whole TFE to be consumed in the polymerization reaction is polymerized. The radical scavenger is more preferably added before 40 mass %, still more preferably 30 mass %, of the whole TFE is polymerized.

The amount of the radical scavenger is preferably an amount corresponding to 0.1 to 20 ppm, more preferably an amount corresponding to 3 to 10 ppm, of the mass of an aqueous medium used.

Examples of the redox polymerization initiator include combination of any oxidizing agent, such as permanganates (e.g., potassium permanganate), persulfates, bromates, chlorates, and hydrogen peroxide, and any reducing agent, such as sulfites, bisulfites, organic acids (e.g., oxalic acid or succinic acid), thiosulfates, ferrous chloride, and diimines. The oxidizing agents and the reducing agents each may be used alone or in combination of two or more.

Particularly preferred is a combination of potassium permanganate and oxalic acid.

The amount of the redox polymerization initiator can be appropriately selected in accordance with the type of a redox polymerization initiator used, the polymerization temperature, and the target SSG. The amount thereof is preferably an amount corresponding to 1 to 100 ppm of the mass of an aqueous medium used.

In order to initiate the polymerization reaction by the redox polymerization initiator, the oxidizing agent and the reducing agent may be simultaneously added, or either of the oxidizing agent or the reducing agent may be added to the container in advance, and then the remaining agent is added thereto.

In the case of initiating the polymerization with the redox polymerization initiator by adding either of the oxidizing agent or the reducing agent to the container in advance, and then adding the remaining agent, the remaining agent is preferably added continually or intermittently.

In order to provide low SSG PTFE with the redox polymerization initiator by adding the remaining agent continually or intermittently, the adding rate is preferably gradually reduced, more preferably the addition is stopped during the polymerization. The timing of stopping the addition is preferably before 80 mass % of the whole TFE to be consumed in the polymerization reaction is polymerized. The timing is more preferably before 65 mass % of the whole TFE is polymerized, still more preferably before 50 mass % of the whole TFE is polymerized, particularly preferably before 30 mass % of the whole TFE is polymerized.

In order to adjust the pH in the aqueous medium within a range that does not deteriorate the redox reactivity in the case of using a redox polymerization initiator, a pH buffer is preferably used. Examples of the pH buffer include inorganic salts such as disodium hydrogen phosphate, sodium dihydrogen phosphate, and sodium carbonate, and disodium hydrogen phosphate dihydrate and disodium hydrogen phosphate dodecahydrate are preferred.

In the case of using a redox polymerization initiator, the redox-reactive metal ion can be a metal having multiple ionic valences. Specific examples thereof include, preferably, transition metals such as iron, copper, manganese, and chromium, and iron is particularly preferred.

The aqueous medium means a medium which gives a place of the polymerization and is a liquid that contains water. The aqueous medium may be water alone or any of those containing water. It may be one containing water and one or both of any fluorine-free organic solvent, such as alcohols, ethers, and ketones, and any fluorine-containing organic solvent having a boiling point of 40° C. or lower.

The polymerization can be performed under a pressure of 0.05 to 5.0 MPa. The pressure is preferably within the range of 0.5 to 3.0 MPa.

The polymerization can be performed at a temperature of 10° C. to 100° C. The temperature is preferably within the range of 50° C. to 90° C.

In the polymerization, any known additive such as stabilizers and chain-transfer agents may be added in accordance with the purposes.

Examples of the stabilizers include saturated hydrocarbons that are substantially inactive to the reaction, are in the form of liquid under the reaction conditions, and have 12 or more carbon atoms. In particular, paraffin wax is preferred. The paraffin wax may be in any form, i.e., liquid, semisolid, or solid, at room temperature. It is preferably a saturated hydrocarbon having 12 or more carbon atoms. In general, the paraffin wax preferably has a melting point of 40° C. to 65° C., more preferably 50° C. to 65° C.

Examples of a stabilizer other than the saturated hydrocarbons include fluorine-type oils, fluorine-type solvents, and silicone oils. Each of these may be used alone or two or more of these may be used in combination. The stabilizer can be used in an amount of 1 to 10 parts by mass for 100 parts by mass of the aqueous medium.

The chain-transfer agents may be any of known agents, and examples thereof include saturated hydrocarbons such as methane, ethane, propane, and butane, halogenated hydrocarbons such as chloromethane, dichloromethane, and difluoroethane, alcohols such as methanol and ethanol, and hydrogen. The amount of the chain-transfer agent is usually 1 to 1000 ppm, preferably 1 to 500 ppm, for the whole amount of the TFE supplied.

In order to adjust the pH in the aqueous medium within a range that does not deteriorate the redox reactivity, a pH buffer is preferably used. Examples of the pH buffer include inorganic salts such as disodium hydrogen phosphate, sodium dihydrogen phosphate, and sodium carbonate, and disodium hydrogen phosphate dihydrate and disodium hydrogen phosphate dodecahydrate are preferred.

In the case of using a redox polymerization initiator, the redox-reactive metal ion can be a metal having multiple ionic valences. Specific examples thereof include, preferably, transition metals such as iron, copper, manganese, and chromium, and iron is particularly preferred.

In order to reduce the amount of coagulum generated during the polymerization, the polymerization may be performed in the presence of 5 to 500 ppm of a dicarboxylic acid based on the amount of the aqueous medium. In such a case, the polymerization is preferably performed in the presence of 10 to 200 ppm of the dicarboxylic acid. If the amount of the dicarboxylic acid is too small relative to the aqueous medium, insufficient effects may be achieved. If the amount thereof is too large, a chain transfer reaction may occur so that the resulting polymer may have a low molecular weight. The amount of the dicarboxylic acid is more preferably 150 ppm or less. The dicarboxylic acid may be added before the start of the polymerization reaction, or may be added during the polymerization.

The dicarboxylic acid is preferably any of those represented by the formula: HOOCRCOOH (wherein R represents a C1-C5 alkylene group), more preferably succinic acid, malonic acid, glutaric acid, adipic acid, or pimelic acid, still more preferably succinic acid.

When the polymerization of PTFE is completed, an aqueous dispersion having a solid concentration of 10 to 50 mass % can be obtained. The aqueous dispersion contains the fluorosurfactant and polytetrafluoroethylene. The polytetrafluoroethylene has an average primary particle size of 150 to 500 nm.

The production method preferably includes a step of coagulating the PTFE in the resulting PTFE aqueous dispersion, a step of collecting the coagulated PTFE, and a step of drying the collected PTFE.

Coagulation of the polytetrafluoroethylene contained in the aqueous dispersion leads to PTFE fine powder.

The PTFE in the polytetrafluoroethylene aqueous dispersion can be formed into and collected as fine powder after coagulation, washing, and drying, and then the fine powder can be used in production of biaxially stretched porous films. In the case of coagulating the polytetrafluoroethylene in the aqueous dispersion, the aqueous dispersion obtained by polymerization of polymer latex, for example, is usually diluted with water to a polymer concentration of 10 to 20 mass %. The temperature of the diluted product is adjusted to 5° C. to 50° C., and the pH thereof may be adjusted to neutral or alkali, if necessary, and then the product is stirred in a container equipped with a stirrer more vigorously than during the reaction. The coagulating temperature can be appropriately selected in accordance with the shape and size of a stirrer used, the polymer concentration, and the target average particle size of fine powder. The coagulation may be performed under stirring while adding, as a coagulating agent, any of water-soluble organic compounds such as methanol and acetone, inorganic salts such as potassium nitrate and ammonium carbonate, and inorganic acids such as hydrochloric acid, sulfuric acid, and nitric acid. The coagulation may be continually performed using, for example, an inline mixer.

The drying of wet powder obtained by coagulating the PTFE is usually performed with the wet powder being maintained in a state of not so much flowing, preferably in a state of being left to stand, by means of vacuum, high frequency, hot air, or the like. In general, friction between particles, especially at high temperature, adversely affects the polytetrafluoroethylene fine powder. This is because the particles of such polytetrafluoroethylene are characteristically easily fibrillated even by a low shearing force, losing the originally stable particle structure. The drying can be performed at a drying temperature of 10° C. to 250° C., preferably 120° C. to 230° C.

The uniaxially stretched porous body of the present invention is formed from the modified PTFE fine powder. Since the uniaxially stretched porous body is formed from the above specific modified PTFE fine powder, it can be produced with high strength, a small pore size, and excellent homogeneity using very usual molding and stretching equipment.

The uniaxially stretched porous body of the present invention can be suitably used as a sealing material, a fiber or a fiber material, or a microfiltration membrane, for example.

The uniaxially stretched porous body of the present invention is preferably a film. If the uniaxially stretched porous body of the present invention is a film, the thickness thereof may be appropriately adjusted in accordance with the purpose and use thereof. The thickness thereof may be any value, and is preferably 5 μm or higher. The thickness is more preferably 10 μm or higher, still more preferably 20 μm or higher. If the thickness is too small, the mechanical strength may be poor. The upper limit of the thickness may be any value, and it may be 1 mm, for example.

The uniaxially stretched porous body of the present invention is also preferably a tube. Such a tube can be suitably used as a filter material for microfiltration membranes, such as air filters and liquid chemical filters. The tube is also useful as a material of products used in the fields of semiconductors, of medical treatment, of electrochemistry, of sealants, of air filters, of air supply/ventilation/internal pressure adjustment, of liquid filters, of water treatment, and of consumer goods. Such a tube can be produced by any conventionally known method.

In the case where the uniaxially stretched porous body of the present invention is a tube, the thickness thereof may be appropriately adjusted in accordance with the purpose and use thereof. The thickness thereof may be any value, and is preferably 5 μm or higher. The thickness is more preferably 50 μm or higher, still more preferably 100 μm or higher. If the thickness is too small, the mechanical strength may be poor. The upper limit of the thickness may be any value, and it may be 5 mm, for example.

The uniaxially stretched porous body of the present invention is also preferably a fiber. Such a fiber is used for cloths, woven fabric such as tent sheets, bag filters, and the like. Such a fiber can be produced by any conventionally known method.

In the case where the uniaxially stretched porous body of the present invention is a film (uniaxially stretched porous film), such a film can be produced by a production method including: a paste extrusion step of paste extruding modified PTFE fine powder to provide a stick- or sheet-like paste extrudate; a rolling step of rolling the stick- or sheet-like paste extrudate to provide a sheet-like rolled film (or rolled sheet); a drying step of removing the liquid lubricant from the rolled film to provide a non-sintered rolled film; an optional semi-sintering step of semi-sintering the non-sintered rolled film to provide a semi-sintered rolled film; a uniaxial stretching step of stretching the resulting non-sintered rolled film or semi-sintered rolled film in the machine direction (MD) to provide a uniaxially stretched porous body; and an optional semi-sintering step of heating the resulting uniaxially stretched porous body (uniaxially stretched film) at least at a temperature not lower than the secondary melting point or heating the resulting uniaxially stretched porous body (uniaxially stretched film) at a temperature not lower than the primary melting point. The machine direction (MD) is usually the same direction as the longitudinal direction, i.e., the paste extruding direction.

The production method preferably includes, before the paste extrusion step, a step of adding a liquid lubricant such as solvent naphtha or white oil to the modified PTFE fine powder and mixing the components to provide PTFE fine powder mixed with the liquid lubricant. The amount of the liquid lubricant is preferably 14 to 34 parts by mass for 100 parts by mass of the modified PTFE fine powder, although it is in accordance with, for example, the paste extrusion conditions to be mentioned later.

The paste extrusion step is preferably such that a rod-like or sheet-like paste extrudate is obtained using an extruder equipped with a die having a specific diameter or a sheet-like die.

In the paste extrusion step, the extrusion pressure can be appropriately set in accordance with the extruder used and the extrusion rate, for example.

In order to provide a uniaxially stretched porous film having high strength, a small pore size, and excellent homogeneity, the extrusion temperature in the paste extrusion step is preferably 5° C. to 100° C. The extrusion temperature is more preferably 30° C. to 80° C.

The paste extrusion step is preferably such that the PTFE fine powder is preformed to provide a preformed article, and then this preformed article is extruded through an extruder to provide a rod-like paste extrudate.

The rolling temperature in the rolling step is preferably 5° C. to 100° C., more preferably 30° C. to 80° C.

The non-sintered PTFE after the rolling usually has a thickness of 20 to 500 µm, preferably 50 to 400 µm.

The drying step may be performed at room temperature or may be performed under heating. If a liquid lubricant is used as mentioned above, the drying can remove the liquid lubricant. The drying temperature is preferably 70° C. to 280° C., more preferably 100° C. to 250° C., although it is in accordance with, for example, the type of a liquid lubricant.

The rolling can be performed using a mill roll or a belt press, for example.

The production method optionally includes a step of semi-sintering the non-sintered PTFE to provide semi-sintered PTFE.

The semi-sintering means heating at a temperature not higher than the primary melting point and not lower than the secondary melting point of PTFE.

The primary melting point means a maximum peak temperature of an endothermic curve existing on the crystal melting curve obtained by differential scanning calorimetry on the non-sintered PTFE.

The secondary melting point means a maximum peak temperature of an endothermic curve existing on the crystal melting curve obtained by differential scanning calorimetry on the PTFE heated up to a temperature (for example, 360° C.) not lower than the primary melting point.

The endothermic curve herein is obtained by increasing the temperature at a temperature-increasing rate of 10° C./min using a differential scanning calorimeter.

In order to provide a uniaxially stretched porous film having high strength, a small pore size, and excellent homogeneity, the uniaxial stretching step preferably satisfies a stretch ratio of 2 to 50 times, more preferably to 30 times.

In order to provide a uniaxially stretched porous film having high strength, a small pore size, and excellent homogeneity, the stretching temperature in the uniaxial stretching step is preferably room temperature to a temperature lower than the primary melting point, more preferably 200° C. to 330° C., still more preferably 250° C. to 300° C.

In order to provide a uniaxially stretched porous film having high strength, a small pore size, and excellent homogeneity, the stretching rate in the uniaxial stretching step is preferably 5 to 2000%/sec, more preferably 7 to 1000%/sec, still more preferably 10 to 700%/sec.

The uniaxial stretching may be performed by any method. Examples of the method in the industrial context include roll stretching and hot-plate stretching.

In the case where the uniaxially stretched porous body of the present invention is a tube (uniaxially stretched porous tube), such a tube can be produced by a production method including: a paste extrusion step of paste extruding modified PTFE fine powder to provide a tube-like paste extrudate; a drying step of drying the liquid lubricant from the tube-like paste extrudate to provide a non-sintered tube; an optional semi-sintering step of semi-sintering the non-sintered tube to provide a semi-sintered tube; a uniaxial stretching step of stretching the resulting non-sintered tube or semi-sintered tube in the machine direction (MD) to provide a uniaxially stretched porous body; and an optional semi-sintering step of heating the resulting uniaxially stretched porous body (uniaxially stretched tube) at least at a temperature not lower than the secondary melting point or heating the resulting uniaxially stretched porous body (uniaxially stretched film) at a temperature not lower than the primary melting point. The machine direction (MD) is usually the same direction as the longitudinal direction, i.e., the paste extruding direction.

The production method preferably includes, before the paste extrusion step, a step of adding a liquid lubricant such as solvent naphtha or white oil to the modified PTFE fine powder and mixing the components to provide PTFE fine powder mixed with the liquid lubricant.

The amount of the liquid lubricant is preferably 14 to 34 parts by mass for 100 parts by mass of the modified PTFE fine powder, although it is in accordance with, for example, the paste extrusion conditions to be mentioned later.

The paste extrusion step is preferably such that a tube-like paste extrudate is obtained using an extruder equipped with a die having a specific diameter and a mandrel tip having a diameter smaller than the die.

In the paste extrusion step, the extrusion pressure can be appropriately set in accordance with the extruder used and the extrusion rate, for example.

In order to provide a uniaxially stretched porous tube having high strength, a small pore size, and excellent homogeneity, the extrusion temperature in the paste extrusion step is preferably 5° C. to 100° C. The extrusion temperature is more preferably 30° C. to 80° C.

The paste extrusion step is preferably such that the PTFE fine powder is preformed to provide a preformed article, and then this preformed article is extruded through an extruder to provide a tube-like paste extrudate.

The drying step may be performed at room temperature or may be performed under heating. If a liquid lubricant is used as mentioned above, the drying can remove the liquid lubricant. The drying temperature is preferably 70° C. to 280° C., more preferably 100° C. to 250° C., although it is in accordance with, for example, the type of a liquid lubricant.

In order to provide a uniaxially stretched porous tube having high strength, a small pore size, and excellent homogeneity, the uniaxial stretching step preferably satisfies a stretch ratio of not smaller than once but smaller than 50 times, more preferably not smaller than once but smaller than 30 times.

In order to provide a uniaxially stretched porous tube having high strength, a small pore size, and excellent homogeneity, the stretching temperature in the uniaxial stretching step is preferably room temperature to a temperature lower than the primary melting point, more preferably 200° C. to 330° C., still more preferably 250° C. to 300° C.

In order to provide a uniaxially stretched porous tube having high strength, a small pore size, and excellent homogeneity, the stretching rate in the uniaxial stretching step is preferably 1 to 2000%/sec, more preferably 3 to 1000%/sec, still more preferably 5 to 700%/sec.

The uniaxial stretching may be performed by any method. Usual examples of the method include roll stretching, hot-plate stretching, and batch stretching.

In order to provide a uniaxially stretched porous tube having high strength, a small pore size, and excellent homogeneity, the production method preferably includes a heat-setting step after the biaxial stretching step. The heat-setting temperature is preferably 300° C. to 420° C., more preferably 350° C. to 400° C.

EXAMPLES

In examples, the respective physical properties are determined by the following methods.

(1) Polymer Concentration

Polytetrafluoroethylene aqueous dispersion (1 g) is dried at 150° C. for 30 minutes in a blowing dryer. The percentage of the mass of the nonvolatile matter to the mass (1 g) of the aqueous dispersion is defined as a polymer solid concentration.

(2) Average Primary Particle Size

A polytetrafluoroethylene aqueous dispersion is diluted with water to have a solid concentration of 0.15 mass %. Then, the transmittance of incident light at 550 nm relative to the unit length of the resulting diluted latex is determined and the number-based length average particle size is determined by measuring the Feret diameter in a transmission electron microscopic image. Based on these values, a calibration curve is drawn. Using this calibration curve, the average primary particle size is determined from the measured transmittance of incident light at 550 nm of each sample.

(3) Amount of Trace Comonomer

Non-melt-processable PTFE fine powder was molten at high temperature and was subjected to $F^{19}$-NMR measurement. The amount of the trace comonomer was calculated from the signals assigned to functional groups in the resulting trace comonomer.

For example, the amount of PMVE used in the examples of the present application was calculated by $F^{19}$-NMR measurement at 360° C. using the following formula:

Amount of trace comonomer(mol %)=$(4B/3)/(A+(B/3))\times 100$ wherein A=sum of $CF_2$ signal and CF signal around −118 ppm; and B=integral value of $CF_3$ signal assigned to PMVE around −52 ppm.

(4) Standard Specific Gravity (SSG)

A sample is produced in conformity with ASTM D4895-89, and the specific gravity of the resulting sample is measured by the water replacement method.

(5) Extrusion Pressure at RR100

In conformity with JP 2002-201217 A, 100 g of PTFE fine powder was first left to stand at room temperature for two hours or longer. The powder was blended with 21.7 g of a lubricant (trade name: Isopar H (registered tradename), Exxon Mobil Corp.) for three minutes. Thereby, a PTFE fine powder mixture was obtained.

The resulting PTFE fine powder mixture was left to stand for two hours in a 25° C. temperature-constant chamber, and then paste-extruded through an orifice (diameter: 2.5 mm, land length: 1.1 cmm, introduction angle: 30°) at a reduction ratio (ratio between the cross-sectional area of the inlet of the die and the cross-sectional area of the outlet thereof) of 100, an extrusion rate of 51 cm/min, and 25° C. Thereby, beading was obtained.

The extrusion pressure is a value determined by measuring a load when the extrusion load reaches equilibrium during the paste extrusion, and then dividing the measured load by the cross-sectional area of a cylinder used in the paste extrusion.

(6) Breaking Strength

The extrusion beading was subjected to a stretching test in the following method in conformity with JP 2002-201217 A, and thereby a sample for breaking strength measurement was produced.

The beading obtained by the paste extrusion was dried at 230° C. for 30 minutes so that the lubricant was removed. The dried beading was cut into an appropriate length and the cut beading was held at its ends by clamps with a gap between the clamps of 5.1 cm. The beading was then heated up to 300° C. in an air-circulation furnace, and the clamps were moved apart from each other at a stretching rate of 100%/sec until the distance between the clamps corresponded to a total stretch of 2400%. Thereby, the stretching test was performed. The "total stretch" refers to the rate of increase in the length of the beading by the stretching based on the length of the beading (100%) before the stretch test.

The stretched beading prepared under the aforementioned stretching conditions was cut into an appropriate length, and the cut beading was fixed by movable jaws with a gauge length of 5.0 cm. The movable jaws were driven at a speed of 300 mm/min, and the breaking strength was measured using a tensile tester at room temperature. The minimum tensile load (force) at break among the tensile loads at break of three samples obtained from the stretched beading, i.e., two samples from the respective ends of the stretched beading (excluding the neck down within the range of the clamps, if exist), and one sample from the center thereof, was defined as the breaking strength.

(7) Stress-Relaxation Time

In accordance with JP 2002-201217 A, the dried beading was stretched in the same manner as in the above stretching test except that the gap between clamps was changed to 3.8 cm and the stretching rate was 1000%/s, and thereby a sample for stress-relaxation time measurement was produced. The total stretch is 2400%.

This sample was fixed at both ends by fixing parts and tightly pulled so that the whole length was 25 cm. The stress-relaxation time was a time from when this sample was put into an oven set to 390° C. to when the sample was broken.

(8) Evaluation of Rollability

First, 28 parts by weight of hydrocarbon oil ("IP Solvent 2028", Idemitsu Kosan Co., Ltd.), serving as an extrusion aid, and 32 parts by weight, for each 100 parts by weight of the modified PTFE fine powder were mixed and the mixture was left to stand for 12 hours.

The mixture of the fine powder and the extrusion aid were put into a 100 φmm preformer and compressed under a pressure of 3 MPa. Thereby, a preform was obtained. Then, the preform was paste-extruded through an extruder having an inner diameter of 100 mm preliminarily equipped with a die having an inner diameter of 16 mmφ, and thereby a PTFE molded article was obtained.

The resulting PTFE molded article was molded (rolled) into a film shape using a calender roll, and thereby a rolled film was obtained.

The hydrocarbon oil was evaporated through a hot-air drying furnace, and thereby a belt-like rolled film having an average thickness of about 100 μm was obtained.

The appearance of the rolled film was evaluated. The criteria for evaluating the appearance of the rolled film are as follows.

Excellent: uniform
Good: uniform (partially not uniform)
Acceptable: not uniform at many sites
Poor: with defects such as partial breakage or cracking (9) Evaluation of Uniaxial Stretching The resulting rolled film was stretched in the machine direction at a stretch ratio of 15 times and a temperature of 250° C. using a stretching device equipped with multiple rolls illustrated in FIG. 1. Thereby, a uniaxially stretched film was obtained.

The appearance of the uniaxially stretched film was evaluated. The criteria for evaluating the appearance of the uniaxially stretched film are as follows.

Good: uniform
Acceptable: with defects such as partial breakage or cracking
Poor: with defects such as breakage or cracking on the whole

(10) Strength of Uniaxially Stretched Film

First, five samples were cut out of a uniaxially stretched porous film. Each sample has a dimension of 15.0 cm in the machine direction (longitudinal direction, i.e., paste extruding direction) and 2.0 cm in the transverse direction (width direction, i.e., direction perpendicular to the paste extruding direction). For the five samples, the tensile strength in the machine direction was measured, and the maximum loads of the respective five samples were determined.

Next, the largest one and the smallest one of the maximum loads of the five samples were eliminated and an average value of the remaining three values was calculated. This average value is defined as the strength of the uniaxially stretched film.

In the tensile strength measurement, a tensile tester equipped with a 50 N load cell was used at a chuck length of 5.0 cm and a cross-head speed of 300 mm/min.

(11) Strength of Uniaxially Stretched Tube

First, 20.5 parts by weight of Isopar G, which is a hydrocarbon chemical, was added to 100 parts by weight of the PTFE fine powder and the mixture was left to stand for 12 hours. The mixture of the fine powder and the extrusion aid were put into a 90 φmm preformer and compressed under a pressure of 3 MPa. Thereby, a preform was obtained. Then, the preform was paste-extruded through an extruder having an inner diameter of 90 mmφ preliminarily equipped with a die having an inner diameter of 16.6 mmφ with a circular cross section and a mandrel tip having an outer diameter of 14.6 mmφ, and thereby a tube-like PTFE molded article was obtained. The resulting tube-like PTFE molded article was dried in an electric furnace for one hour, and then stretched four times in the longitudinal direction of the tube in the 300° C. furnace. The stretched tube was cut open, and was punched with a microdumbbell of ASTM D1708 in the longitudinal direction of the tube, and thereby a sample was prepared. This sample was subjected to the measurement using a tensile tester equipped with a 50 N load cell at a chuck length of 5.0 cm and a cross-head speed of 200 mm/min.

(12) Average Pore Size of Uniaxially Stretched Tube

The mean flow pore size (MFP) was measured in conformity with ASTM F316-86, and this value was defined as the average pore size.

Example 1

A 6-L stainless steel (SUS316) autoclave provided with a stainless steel (SUS316) anchor stirrer and a temperature control jacket was charged with 3560 ml of deionized water, 104 g of paraffin wax, and 5.4 g of $CF_3OCF(CF_3)CF_2OCF(CF_3)COONH_4$ (fluorosurfactant A) serving as a fluorosurfactant. The system was purged with nitrogen gas three times and with TFE gas twice under heating up to 70° C., so that oxygen was removed. Then, the pressure inside the container was adjusted to 0.60 MPa by TFE gas, the contents were stirred at 250 rpm, and the temperature inside the container was maintained at 70° C.

Next, 0.30 g of perfluoromethyl vinyl ether (PMVE) was injected with TFE so that the pressure inside the container of the autoclave was adjusted to 0.70 MPa.

An aqueous solution of ammonium persulfate (15.4 mg) in deionized water (20 ml) was injected with TFE so that the pressure inside the container of the autoclave was adjusted to 0.78 MPa, and the polymerization reaction was started.

The pressure inside the container decreased as the polymerization reaction proceeded. Thus, TFE was continually supplied so as to always maintain the pressure inside the container of the autoclave at 0.78±0.05 MPa. The temperature inside the container was maintained at 70° C. and the stirring speed was maintained at 250 rpm.

When 429 g (35.0 mass % relative to the whole amount (1225 g) of TFE to be polymerized) of TFE was consumed, an aqueous solution of hydroquinone (14.32 mg (4.0 ppm relative to the aqueous medium)) serving as a radical scavenger in deionized water (20 ml) was injected with TFE.

The polymerization was further continued. When 1225 g of TFE was consumed, the stirring and the supply of the monomer were stopped. The gas inside the autoclave was immediately released to normal pressure and the reaction was finished. Thereby, an aqueous dispersion of modified PTFE was obtained. Only a trace of the polymer coagulum was observed in the polymerization container.

Next, a 6-L tank provided with a stirrer and a baffle was charged with the PTFE aqueous dispersion diluted with deionized water, and the stirring was started. At this time, nitric acid was put into the coagulation tank. After the polymer powder was separated from water, the stirring was stopped. The resulting wet powder was filtered, and the residue was washed with deionized water. The residue was then dried for 18 hours in a hot-air circulating dryer set to 210° C. Thereby, a modified PTFE fine powder was obtained.

Example 2

A modified PTFE fine powder was obtained in the same manner as in Example 1 except that the amount of PMVE was changed to 0.45 g.

Comparative Example 1

A modified PTFE aqueous dispersion was obtained using ammonium perfluorooctanoate (APFO) as a fluorosurfactant in accordance with the method disclosed in Example 5 of JP 4951970 B. The resulting modified PTFE aqueous dispersion was coagulated, washed with water, and dried in the same manner as in Example 1, and thereby a modified PTFE fine powder was obtained. The drying of the wet powder was performed at 210° C.

Comparative Example 2

A modified PTFE fine powder was obtained in the same manner as in Comparative Example 1 except that the temperature of drying the wet powder was changed to 160° C.

Comparative Example 3

A modified PTFE fine powder was obtained in the same manner as in Example 2 except that the fluorosurfactant was changed to APFO (amount: 5.4 g).

For the resulting modified PTFE aqueous dispersions and modified PTFE fine powders obtained in Examples 1 and 2 and Comparative Examples 1 to 3, the respective parameters were measured and evaluated.

Table 1 shows the measurement and evaluation results.

In Comparative Examples 1 to 3 in which the fluorosurfactant was ammonium perfluorooctanoate, the resulting modified fine powders each had a breaking strength of higher than 30N. However, the extrusion pressures thereof exceeded 20 MPa. Further, the rolled films each partially had a defect such as breakage, poor appearance, and poor rollability. In contrast, in Examples 1 and 2 in which the fluorosurfactant was $CF_3OCF(CF_3)CF_2OCF(CF_3)COONH_4$ having a LogPOW value of 3.4 or lower, the resulting modified fine powders each had an extrusion pressure of 19 MPa or lower and a breaking strength of higher than 30 N. The rolled films and the uniaxially stretched films had excellent appearance, and the uniaxially stretched films had high strength.

Example 3

A modified PTFE fine powder was obtained in the same manner as in Example 1 except that the amount of PMVE was changed to 0.60 g.

Example 4

A modified PTFE fine powder was obtained in the same manner as in Example 3 except that the temperature of drying the wet powder obtained in Example 3 was changed to 180° C.

Example 5

A modified PTFE fine powder was obtained in the same manner as in Example 3 except that the temperature of drying the wet powder obtained in Example 3 was changed to 160° C.

Example 6

A modified PTFE fine powder was obtained in the same manner as in Example 1 except that the amount of PMVE was changed to 0.75 g and the temperature of drying the wet powder was changed to 180° C.

Example 7

A modified PTFE fine powder was obtained in the same manner as in Example 6 except that the amount of PMVE was changed to 1.00 g.

Example 8

A modified PTFE fine powder was obtained in the same manner as in Example 6 except that the amount of PMVE was changed to 2.00 g.

Comparative Example 4

A modified PTFE fine powder was obtained in the same manner as in Example 3 except that the fluorosurfactant was changed to APFO (amount: 5.4 g).

Comparative Example 5

A modified PTFE aqueous dispersion was obtained using APFO as a fluorosurfactant in accordance with the method disclosed in Comparative Example 1 of JP 4951970 B. The resulting modified PTFE aqueous dispersion was coagulated, washed with water, and dried in the same manner as in Example 1, and thereby a modified PTFE fine powder was obtained. The drying of the wet powder was performed at 210° C.

Comparative Example 6

A modified PTFE fine powder was obtained in the same manner as in Comparative Example 5 except that the temperature of drying the wet powder was changed to 160° C.

Comparative Example 7

A modified PTFE aqueous dispersion was obtained using APFO as a fluorosurfactant in accordance with the method disclosed in Comparative Example 2 of JP 4951970 B. The resulting modified PTFE aqueous dispersion was coagulated, washed with water, and dried in the same manner as in Example 1, and thereby a modified PTFE fine powder was obtained. The drying of the wet powder was performed at 210° C.

Comparative Example 8

A modified PTFE fine powder was obtained in the same manner as in Comparative Example 7 except that the temperature of drying the wet powder was changed to 160° C.

For the modified PTFE aqueous dispersions and the modified PTFE fine powders obtained in Examples 3 to 8 and Comparative Examples 4 to 8, the respective parameters were measured and evaluated. Tables 2 and 3 show the measurement and evaluation results.

In Comparative Examples 4 to 8 in which the fluorosurfactant was ammonium perfluorooctanoate, the respective modified fine powders were broken in the stretching.

In contrast, in Examples 3 to 8 in which the fluorosurfactant was $CF_3OCF(CF_3)CF_2OCF(CF_3)COONH_4$ having a LogPOW value of 3.4 or lower, the resulting modified fine powders were formed into stretched bodies without breakage in the stretching. The extrusion pressure was 19 MPa or lower and the breaking strength was higher than 30 N in each case. The rolled films and the uniaxially stretched films had excellent appearance, and the uniaxially stretched films had high strength.

Comparative Example 9

A modified PTFE fine powder was obtained in the same manner as in Example 1 except that the amount of PMVE was changed to 3.60 g.

Comparative Example 10

A modified PTFE fine powder was obtained in the same manner as in Example 1 except that the amount of PMVE was changed to 0.11 g.

Comparative Example 11

A homo-PTFE aqueous dispersion and a homo-PTFE fine powder were obtained in accordance with the method disclosed in Example 2 of WO 2010/113950.

For the modified PTFE aqueous dispersions and the modified PTFE fine powders obtained in Comparative Examples 9 to 11, the respective parameters were measured and evaluated.

Table 4 shows the measurement and evaluation results.

In Comparative Example 9 in which the PMVE content was high, the resulting modified fine powder was broken in the stretching.

In Comparative Example 10 in which the PMVE content was low, the extrusion pressure was 18 MPa or lower but the breaking strength was lower than 28 N. The rolled film and the uniaxially stretched film had excellent appearance, but the uniaxially stretched film had low strength, which was not satisfactory.

In Comparative Example 11 in which homo-PTFE was prepared by polymerization without any trace comonomer, the breaking strength was higher than 35 N and was excellent, but the rolled film and the uniaxially stretched film partially had a defect such as breakage. The uniaxially stretched film had low strength, which was not satisfactory.

With the modified PTFE fine powder obtained in Example 3 and the homo-PTFE fine powder obtained in Comparative Example 11, the strengths and average pore sizes of the respective uniaxially stretched tubes were determined.

Table 5 shows the measurement results.

The uniaxially stretched tube molded from the modified PTFE fine powder obtained in Example 3 had a higher strength and a smaller average pore size than the uniaxially stretched tube molded from the homo-PTFE fine powder obtained in Comparative Example 11.

TABLE 1

| Parameter | | Unit | Example 1 | Example 2 | Comparative Example 1 | Comparative Example 2 | Comparative Example 3 |
|---|---|---|---|---|---|---|---|
| Fluorosurfactant | | — | Surfactant A | Surfactant A | APFO | APFO | APFO |
| Polymer concentration | | mass % | 25.2 | 25.4 | 25.0 | — | 25.3 |
| Average primary particle size | | nm | 246 | 235 | 230 | — | 221 |
| Trace comonomer | | — | PMVE | — | PMVE | PMVE | PMVE |
| Amount of trace comonomer | | mol % | 0.015 | 0.022 | 0.018 | — | 0.022 |
| Standard specific gravity (SSG) | | — | 2.148 | 2.147 | 2.148 | — | 2.147 |
| Extrusion pressure at RR100 | | MPa | 18.0 | 18.2 | 22.8 | 20.3 | 22.8 |
| Breaking strength | | N | 34.8 | 36.8 | 39.9 | 35.4 | 30.6 |
| Stress-relaxation time | | sec | 460 | 440 | 460 | 440 | 160 |
| Amount of aid 28 parts by mass | Appearance of rolled film | — | Excellent | Good | Poor | Poor | Poor |
| | Appearance of uniaxially stretched film | — | Good | Good | — | — | — |
| | Strength of uniaxially stretched film | MPa | 71.5 | 75.7 | — | — | — |
| Amount of aid 32 parts by mass | Appearance of rolled film | — | Excellent | Good | Poor | Acceptable | Poor |
| | Appearance of uniaxially stretched film | — | Good | Good | — | Acceptable | — |
| | Strength of uniaxially stretched film | MPa | 53.7 | 57.0 | — | 43.7 | — |

TABLE 2

| Parameter | Unit | Example 3 | Example 4 | Example 5 | Example 6 | Example 7 | Example 8 |
|---|---|---|---|---|---|---|---|
| Fluorosurfactant | — | Surfactant A | Surfactant A | Surfactant A | Surfactant A | Surfactant A | Surfactant A |
| Polymer concentration | mass % | 25.4 | — | — | 25.4 | 25.2 | 25.2 |
| Average primary particle size | nm | 234 | — | — | 234 | 232 | 229 |
| Trace comonomer | — | PMVE | PMVE | PMVE | PMVE | PMVE | PMVE |
| Amount of trace comonomer | mol % | 0.028 | — | — | 0.035 | 0.046 | 0.091 |
| Standard specific gravity (SSG) | — | 2.145 | — | — | 2.144 | 2.140 | 2.136 |
| Extrusion pressure at RR100 | MPa | 18.5 | 17.0 | 18.3 | 17.5 | 17.8 | 18.5 |
| Breaking strength | N | 37.8 | 33.4 | 30.6 | 32.0 | 31.4 | 30.4 |
| Stress-relaxation time | sec | 420 | 400 | 390 | 380 | 370 | 330 |

TABLE 2-continued

| | Parameter | Unit | Example 3 | Example 4 | Example 5 | Example 6 | Example 7 | Example 8 |
|---|---|---|---|---|---|---|---|---|
| Amount of aid 28 parts by mass | Appearance of rolled film | — | Good | Excellent | Excellent | Excellent | Excellent | Good |
| | Appearance of uniaxially stretched film | — | Good | Good | Good | Good | Good | Good |
| | Strength of uniaxially stretched film | MPa | 80.3 | 70.1 | 64.2 | 68.2 | 65.9 | 65.7 |
| Amount of aid 32 parts by mass | Appearance of rolled film | — | Good | Excellent | Excellent | Excellent | Excellent | Good |
| | Appearance of uniaxially stretched film | — | Good | Good | Good | Good | Good | Good |
| | Strength of uniaxially stretched film | MPa | 60.5 | 54.8 | 50.8 | 52.0 | 51.7 | 50.2 |

TABLE 3

| | Parameter | Unit | Comparative Example 4 | Comparative Example 5 | Comparative Example 6 | Comparative Example 7 | Comparative Example 8 |
|---|---|---|---|---|---|---|---|
| Fluorosurfactant | | — | APFO | APFO | APFO | APFO | APFO |
| Polymer concentration | | mass % | 25.2 | 25.0 | — | 25.0 | — |
| Average primary particle size | | nm | 220 | 218 | — | 220 | — |
| Trace comonomer | | — | PMVE | PMVE | PMVE | PMVE | PMVE |
| Amount of trace comonomer | | mol % | 0.027 | 0.036 | — | 0.069 | — |
| Standard specific gravity (SSG) | | — | 2.145 | 2.142 | — | 2.137 | — |
| Extrusion pressure at RR100 | | MPa | 22.8 | 23.2 | 20.6 | 23.5 | 21.2 |
| Breaking strength | | N | Broken in stretching | Broken in stretching | Broken in stretching | Broken in stretching | Broken in stretching |
| Stress-relaxation time | | sec | — | — | — | — | — |
| Amount of aid 28 parts by mass | Appearance of rolled film | — | — | — | — | — | — |
| | Appearance of uniaxially stretched film | — | — | — | — | — | — |
| | Strength of uniaxially stretched film | MPa | — | — | — | — | — |
| Amount of aid 32 parts by mass | Appearance of rolled film | — | — | — | — | — | — |
| | Appearance of uniaxially stretched film | — | — | — | — | — | — |
| | Strength of uniaxially stretched film | MPa | — | — | — | — | — |

TABLE 4

| | Parameter | Unit | Comparative Example 9 | Comparative Example 10 | Comparative Example 11 |
|---|---|---|---|---|---|
| Fluorosurfactant | | — | Surfactant A | Surfactant A | Surfactant A |
| Polymer concentration | | mass % | 25.3 | 25.2 | 30.9 |
| Average primary particle size | | nm | 218 | 273 | 339 |
| Trace comonomer | | — | PMVE | PMVE | — |
| Amount of trace comonomer | | mol % | 0.18 | 0.005 | — |
| Standard specific gravity (SSG) | | — | 2.135 | 2.151 | 2.152 |
| Extrusion pressure at RR100 | | MPa | 21.3 | 17.0 | 19.1 |
| Breaking strength | | N | Broken in stretching | 27.7 | 35.2 |
| Stress-relaxation time | | sec | — | 460 | 680 |
| Amount of aid 28 parts by mass | Appearance of rolled film | — | — | Excellent | Poor |
| | Appearance of uniaxially stretched film | — | — | Good | — |
| | Strength of uniaxially stretched film | MPa | — | 57.1 | — |
| Amount of aid 32 parts by mass | Appearance of rolled film | — | — | Excellent | Acceptable |
| | Appearance of uniaxially stretched film | — | — | Good | Acceptable |
| | Strength of uniaxially stretched film | MPa | — | 45.6 | 47.5 |

TABLE 5

| Parameter | Unit | Example 3 | Comparative Example 11 |
|---|---|---|---|
| Strength of uniaxially stretched tube | MPa | 14.6 | 10.1 |
| Average pore size of uniaxially stretched tube | μm | 1.22 | 2.64 |

INDUSTRIAL APPLICABILITY

The modified PTFE fine powder of the present invention is suitable for forming porous bodies such as uniaxially stretched porous films.

REFERENCE SIGNS LIST

1: Feeding roll for rolled film
2: Take-up roll
3, 4, 5, 8, 9, 10, 11, 12: Roll
6, 7: Heat roll

The invention claimed is:
1. A modified polytetrafluoroethylene fine powder, having non-melt-processability, having a standard specific gravity of 2.155 or lower, comprising 0.015 mol % or more and 0.091 mol % or less of a polymer unit derived from perfluoro(methyl vinyl ether) in all the monomer units, being obtained by emulsion copolymerizing tetrafluoroethylene and at least the perfluoro(methyl vinyl ether) in the presence of a fluorosurfactant having a LogPOW value of 3.4 or lower, and wherein the powder is used to produce a paste via paste extrusion, wherein extrusion pressure during said paste extrusion is 20.0 MPa or lower.

2. The modified polytetrafluoroethylene fine powder according to claim 1,
wherein the amount of the polymer unit derived from the perfluoro(methyl vinyl ether) is 0.025 mol % or more and 0.050 mol % or less in all the monomer units.

3. The modified polytetrafluoroethylene fine powder according to claim 1, having a breaking strength of 28 N or higher.

4. The modified polytetrafluoroethylene fine powder according to claim 1, having a breaking strength of 30 N or higher.

5. The modified polytetrafluoroethylene fine powder according to claim 1, having a breaking strength of 32 N or higher.

6. The modified polytetrafluoroethylene fine powder according to claim 1, having a breaking strength of 34 N or higher.

7. The modified polytetrafluoroethylene fine powder according to claim 1, having a breaking strength of 36 N or higher.

8. The modified polytetrafluoroethylene fine powder according to claim 1, having an average primary particle size of 210 nm or greater and 300 nm or smaller.

9. A uniaxially stretched porous body, which is formed from the modified polytetrafluoroethylene fine powder according to claim 1.

10. The uniaxially stretched porous body according to claim 9, which is a film.

11. The uniaxially stretched porous body according to claim 9, which is a tube.

12. The uniaxially stretched porous body according to claim 9, which is a fiber.

13. A modified polytetrafluoroethylene fine powder,
having non-melt-processability,
having a standard specific gravity of 2.155 or lower,
comprising 0.015 mol % or more and 0.091 mol % or less of a polymer unit derived from perfluoro(methyl vinyl ether) in all the monomer units,
being obtained by emulsion copolymerizing tetrafluoroethylene and at least the perfluoro(methyl vinyl ether) in the presence of a fluorosurfactant having a LogPOW value of 3.4 or lower, and
wherein the powder is used to produce a paste via paste extrusion, wherein extrusion pressure during said paste extrusion is 20.0 MPa or lower;
wherein the fluorosurfactant having a LogPOW value of 3.4 or lower is at least one fluorosurfactant selected from the group consisting of those represented by the following formula:

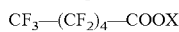

(wherein X represents a hydrogen atom, $NH_4$, or an alkali metal), those represented by the following formula:

(wherein X represents a hydrogen atom, $NH_4$, or an alkali metal atom), those represented by the following formula:

(wherein X represents a hydrogen atom, $NH_4$, or an alkali metal atom), and those represented by the following formula:

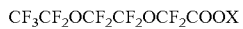

(wherein X represents a hydrogen atom, $NH_4$, or an alkali metal atom).

14. A modified polytetrafluoroethylene fine powder,
having non-melt-processability,
having a standard specific gravity of 2.155 or lower,
comprising 0.015 mol % or more and 0.091 mol % or less of a polymer unit derived from perfluoro(methyl vinyl ether) in all the monomer units,
being obtained by emulsion copolymerizing tetrafluoroethylene and at least the perfluoro(methyl vinyl ether) in the presence of a fluorosurfactant having a LogPOW value of 3.4 or lower, and
wherein the powder is used to produce a paste via paste extrusion, wherein extrusion pressure during said paste extrusion is 20.0 MPa or lower;
wherein the fluorosurfactant having a LogPOW value of 3.4 or lower is at least one fluorosurfactant selected from the group consisting of those represented by the following formula:

(wherein X represents a hydrogen atom, $NH_4$, or an alkali metal atom) and those represented by the following formula:

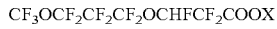

(wherein X represents a hydrogen atom, $NH_4$, or an alkali metal atom).

15. The modified polytetrafluoroethylene fine powder according to claim 13,
wherein the fluorosurfactant has a LogPOW value of 2.5 or higher and 3.4 or lower.

16. The modified polytetrafluoroethylene fine powder according to claim 14,
wherein the fluorosurfactant has a LogPOW value of 2.5 or higher and 3.4 or lower.

* * * * *